United States Patent [19]

Diamond et al.

[11] 4,420,808

[45] Dec. 13, 1983

[54] MULTI-AXIS FORCE STICK, SELF-TRIMMED AIRCRAFT FLIGHT CONTROL SYSTEM

[75] Inventors: Edmond D. Diamond, Huntington; Joseph R. Maciolek, Milford; Leo Kingston, Stratford, all of Conn.

[73] Assignee: United Technologies Corporation, Hartford, Conn.

[21] Appl. No.: 340,423

[22] Filed: Jan. 18, 1982

Related U.S. Application Data

[63] Continuation of Ser. No. 136,233, Apr. 1, 1980, abandoned.

[51] Int. Cl.³ .................... G06G 7/70; B64C 11/44
[52] U.S. Cl. .................... 364/434; 244/177; 244/223; 364/433; 364/161; 73/862.05
[58] Field of Search ............... 244/175, 177, 184, 192, 244/220, 221, 223, 236, 237; 318/611; 73/862.05, 862.04

[56] References Cited

U.S. PATENT DOCUMENTS

| | | | |
|---|---|---|---|
| 2,946,943 | 7/1960 | Nye et al. | 318/611 |
| 3,136,502 | 6/1964 | Auld, Jr. et al. | 244/184 |
| 3,386,689 | 6/1968 | Parker et al. | 244/184 X |
| 3,521,839 | 7/1970 | Diani | 244/184 X |
| 3,561,280 | 2/1971 | MacPhee et al. | 244/236 X |
| 3,696,282 | 10/1972 | Hirokawa et al. | 244/192 X |
| 3,771,037 | 11/1973 | Bailey, Jr. | 244/337 X |
| 4,046,005 | 9/1977 | Goroski | 244/236 X |
| 4,198,021 | 4/1980 | Meredith et al. | 244/236 X |
| 4,216,467 | 8/1980 | Colston | 73/862.05 |
| 4,330,829 | 5/1982 | Fischer et al. | 364/434 |

Primary Examiner—Felix D. Gruber
Attorney, Agent, or Firm—M. P. Williams

[57] ABSTRACT

A four axis force stick provides signals indicative of force applied to the stick in an axis corresponding to a control axis of an aircraft, including pitch, roll, yaw and lift/speed. The force-related signals are applied through proportional and integral gain signal paths to operate electrohydraulic servos that control the aerodynamic surfaces of the aircraft, such as the cyclic and collective blade pitch of the main rotor and the tail rotor blade pitch of a helicopter, or the ailerons, rudder, elevator and thrust of a fixed wing aircraft. Signal conditioning provides a dead band to avoid integrating minute, inadvertent force stick signal outputs, and vernier sensitivity at low forces with high gain at high forces. Analog and digital embodiments are discussed. The relationship between this wholly new mode of aircraft control and ancillary aircraft functions, such as ground steering, autopilot and stability functions, are also discussed.

3 Claims, 6 Drawing Figures

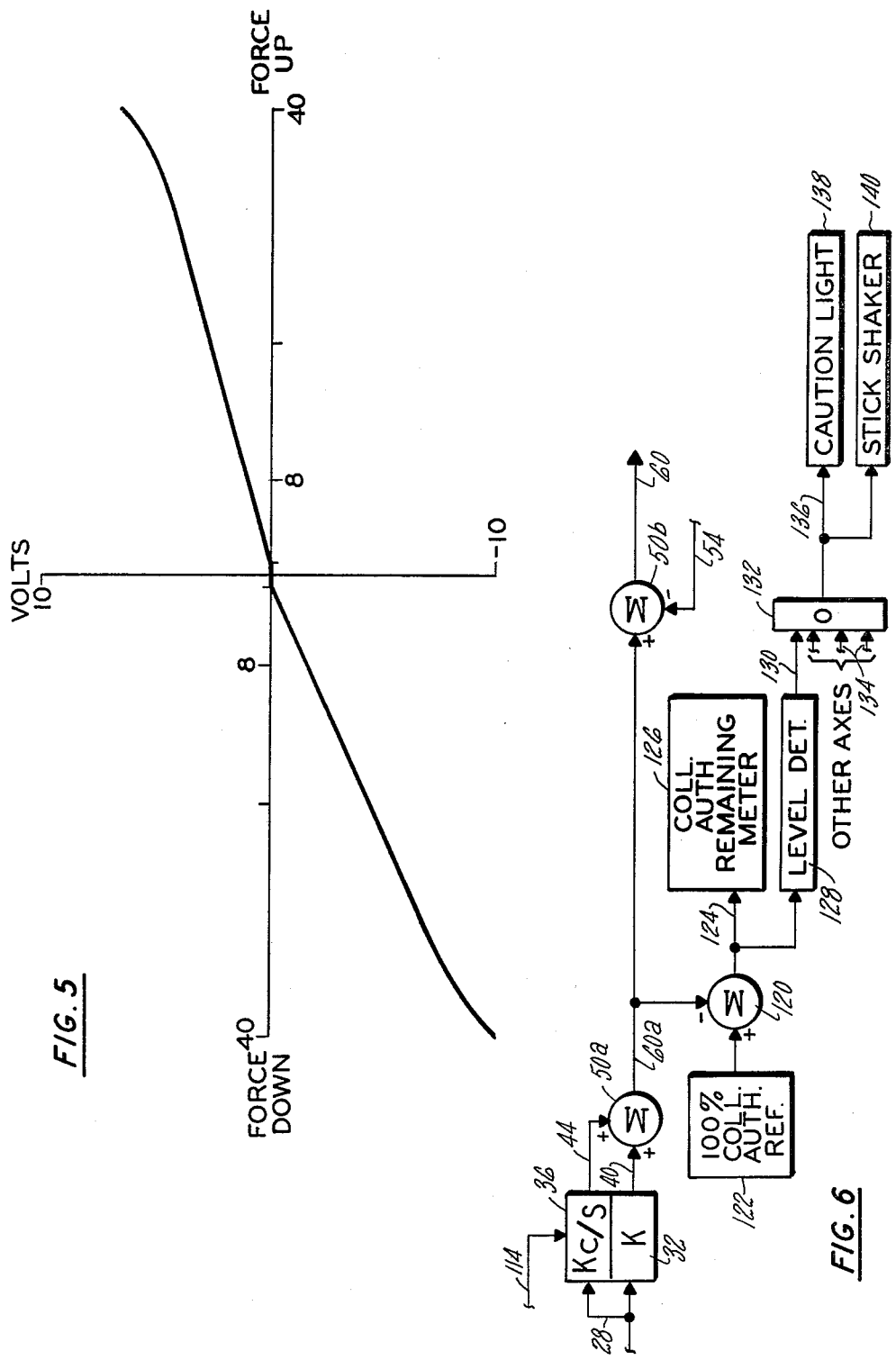

MULTI-AXIS FORCE STICK, SELF-TRIMMED AIRCRAFT FLIGHT CONTROL SYSTEM

CROSS REFERENCE TO RELATED APPLICATIONS

This is a continuation of application Ser. No. 136,233 filed Apr. 1, 1980 now abandoned.

DESCRIPTION

1. Technical Field

This invention relates to aircraft control systems, and more particularly to an aircraft control system providing an entirely new mode of control.

2. Background Art

In both fixed wing and rotary wing (helicopter) aircraft, it is common for the pilot to use a variety of positionable controls, such as sticks, levers, wheels and pedals, to position the control or aerodynamic surfaces of the aircraft, thereby to control the aircraft attitude, altitude, speed and the like. In the simplest of systems, the controls are connected by cables to the control surfaces (such as pedals connected by cables to the rudder of a fixed wing light plane). In more complicated systems, the controls may have mechanical connections which are boosted by hydraulic servos, or the like.

As aircraft systems become more and more complicated, the useful space in the cockpit which is accessible to the pilots becomes more nearly filled with instruments, switches and the like. Thus, the controls themselves compete for cockpit space with other apparatus.

In a typical aircraft, there is a control wheel on a stick that controls the roll and pitch of the aircraft, pedals that control a rudder, and a throttle console for controlling the engine thrust. In a helicopter, there is typically a cyclic pitch stick for controlling pitch and roll of the aircraft, pedals for controlling yaw, and a collective pitch stick for controlling vertical lift. These controls and their mechanical connections to control surfaces or servo mechanisms responsive thereto, together encumber the cockpit space to a large degree. For instance, the presence of the control wheel or stick in front of the pilot seat renders it impractical to have electronic displays or the like immediately in front of the pilot due to the need for moving the wheel or the stick into various positions in that space, and due to the fact that the presence of such apparatus blocks the vision of the pilot in certain angles. The presence of foot pedals renders it difficult to provide forward and downward visibility to the pilots, as would be useful in helicopters employed in logging operations, construction and the like. Additionally, whenever passengers sit in one of the pilot seats, inadvertent control inputs can be provided by unwanted passenger contact with the controls. Access into and out of the pilot seats is also encumbered to varying degrees by these controls.

In systems employing pilot and copilot controls, it is essential that the controls by synchronized positionally to each other, so that one pilot can take over from the other without providing abrupt inputs into the control system. For this reason, each of the pilot controls is normally mechanically connected with the corresponding copilot control. For the most part, such interconnections are mechanical, because hydraulic or electric sensors and actuators necessary to avoid mechanical connections are too slow and cumbersome for such use.

In order to avoid some of the deficiencies noted above, attempts have been made in the past to provide "side-arm" controllers which may be operated by a pilot while his hand is resting on the arm of a seat. Also, in aircraft or space craft in which the pilots have to withstand high gravitational forces, the cushioning of the pilot in a seat has led to the use of some side-arm controllers. Typical side-arm controllers which have found some measure of success are limited to two axes, usually including pitch and roll. However, this leaves throttles or collective pitch sticks and pedals to be dealt with in the traditional fashion, thereby requiring the pilot to reach outside of his seat for hand controls, and forcing his position to be established relative to foot pedals. This also fails to clear the clutter out of the cockpit to the fullest extent.

There have also been attempts to make side-arm controllers operative in more than two axes. These may include pitch, roll and yaw, or pitch, roll and collective (or throttle, in the case of a fixed wing plane). However, there has been a universal failure in side-arm controllers designed to control three or more axes due to the cross coupling between the axes. Thus, if one is controlling pitch and roll with fore-aft and right-left motion, one cannot also control collective pitch in a helicopter with an up-down motion of the same stick, since any tendency to move the stick fore and aft also results in the stick moving up and down to a certain degree (and vice versa). It is believed that this is an inherent problem of the manner in which the human hand is connected to the human forearm, with essentially a pivot at the wrist. This conflicts with the pivotal action of a side-arm controller having three or more axes since the natural human wrist motion causes coupling between stick motions in the different axes. The same is true with respect to twisting motions when they are combined with fore-aft and right-left motions.

In order to reduce aircraft weight, to provide redundancy in systems for additional reliability and survivability, and to take advantage of modern technology (such as computers), there has been some investigation of "fly-by-wire" systems, which are characterized by sensors and actuators connected either electrically or optically (or both) to avoid mechanical interconnections in an aircraft. In such a case, the typical mechanical linkage operating a booster servo to position the control surfaces of an aircraft might be supplanted by an electrical position sensor which in turn controls an electro-hydraulic actuator. However, there has heretofore been difficulty in providing fly-by-wire systems which can cause synchronization between the pilot and copilot controls without undue added complexity and cockpit-mounted apparatus. Thus in fly-by-wire systems adapted for use in air-craft having controls common at this time, mechanical interconnections between the pilot and copilot controls and electrical transducers connected to the single mechanical connection are typically proposed. This is necessitated by the fact that the position (such as the cyclic stick in a helicopter or the wheel of a fixed wing aircraft) must be in the same position at both the pilot and copilot stations if transfer of control is to be shifted between the pilot and the copilot. But the motion or position of such controls cannot be readily synchronized other than mechanically due to the inherent difficulty of suitably fast follow-up systems which do not take up too much space.

DISCLOSURE OF INVENTION

Objects of the invention include providing air-craft controls which reduce cockpit clutter, permit improved visibility, reduce pilot fatigue and support fly-by-wire and/or fly-by-light control systems.

This invention is predicated on our discovery that coupling between the axes of side-arm controllers having three or more axes of control is eliminated by the use of a force-responsive control stick, with no perceptible motion required in order to provide the necessary force inputs. This invention is also predicated on our discovery that a multi-axis force stick provides an improved input to an aircraft control system when utilized as a trim adjustment, in a system employing forward integral and proportional paths with a suitable response characteristic, which is on the order of pilot reaction time to aircraft response to the inputs made thereto through the force stick.

According to the invention, a control stick operable in more than two axes in responsive to force applied in the plurality of axes by the pilot to provide proportional and relatively fast integral inputs to rapid, full authority control surface position actuators.

According to the invention, a force stick, operable in three or four axes, responsive to force within a suitable control range of forces, and without any motion which is perceptible to the pilot while controlling the aircraft in flight, is used as an input to a control system. In still further accord with the present invention, electrical signals from a control stick are utilized to provide proportional and integral commands to actuators which adjust the position of the control surface of the aircraft, whereby the electrical inputs provided by the pilot adjust a continuously updated trim point in each of the controlled axes.

The present invention (the use of a multi-axis force stick together with a proportional and integral control system) provides the capability for a pilot to control an aircraft in response to his perceptions of changes in attitude, altitude, speed, heading and the like, with control inputs provided by the pilot only in the event that a change in the aircraft response is desired. This comprises a wholly new concept of aircraft flight control (flying to trim).

The present invention provides, for the first time, the capability of employing a single control stick (such as on a side-arm controller) to control three or four axes without any coupling between the axes. The invention significantly reduces pilot fatigue since uncomfortable positioning and excessive motion of the pilot's body is not required, as is true of common, position-related control systems. Because it permits flying to a constantly updatable trim point in each of the controlled axes, the invention eliminates the need for synchronization between the pilot and copilot sticks. The invention allows elimination of the large conventional sticks, pedals and the like which hinder visibility of instruments and of the outside world and which take up excessive space. The invention reduces pilot workload without any compromise of air-craft maneuverability. The invention makes it possible, for the first time, to fly an aircraft without use of the feet, and with one free hand. The invention further permits the provision of highly sophisticated aircraft control systems at a cost which is inherently capable of being less than the cost of conventional stick and pedal systems. The invention may be readily implemented in the light of the specific teachings thereof which follow hereinafter by employment of apparatus and technology which is well within the skill of the art.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 5 is an illustration of another response characteristic; and

FIG. 6 is a partial schematic diagram of a modification to the system of FIG. 2 for providing power remaining indications.

BEST MODE FOR CARRYING OUT THE INVENTION

Figure 1:
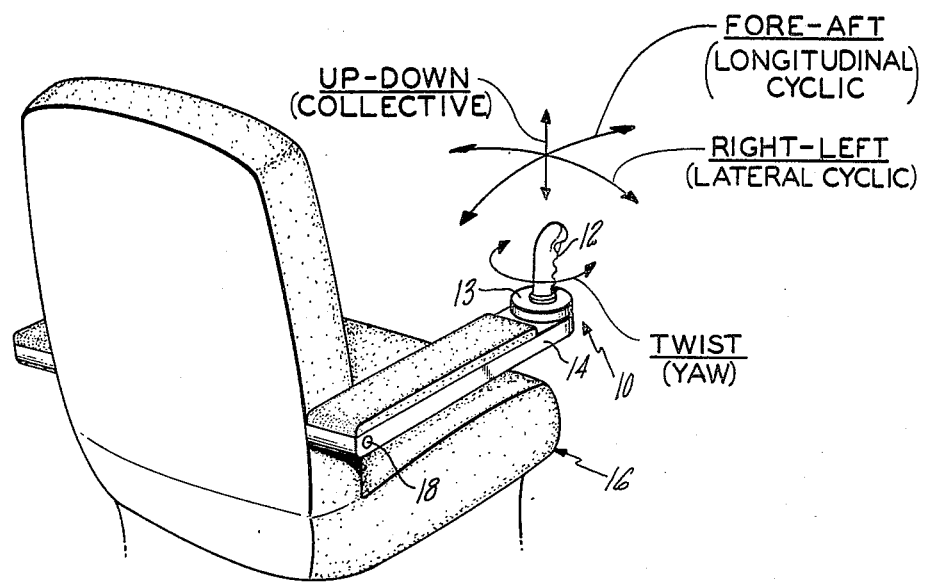
FIG. 1 is a perspective illustration of a side-arm controller in accordance with the invention.

Referring now to FIG. 1, a side-arm controller 10 according to the invention may comprise a stick 12 mounted on a suitable sensing transducer assembly 13 which is disposed on an arm 14 of a pilot seat 16. The arm 14 may be pivoted as at 18 so as to be rotatable upwardly and out of the way, thereby to provide access to the seat or to remove the side-arm controller 10 from the vicinity of a passenger's hand, if desired. As illustrated in FIG. 1, the side-arm controller 10 has four axes including fore-aft, right-left, up-down and twist. The fore-aft axis may relate to the pitch of the aircraft, and thereby control the longitudinal cyclic pitch channel of a helicopter or the elevator of a fixed wing aircraft. The right-left axis of the controller 12 may be used to control roll, and therefore control the lateral cyclic pitch channel of a helicopter or the ailerons of a fixed wing aircraft. The twist axis of the controller 10 may be used to control yaw, and therefore control the tail rotor pitch channel of a helicopter, or the rudder of a fixed wing aircraft. The up-down axis of the controller 10 may control lift/speed, and therefore control the collective pitch channel of a helicopter or the throttle and/or engine/propeller blade pitch of a fixed wing aircraft.

In accordance with one aspect of the invention, the controller 10 is a force controller capable of responding to measurably distinct forces applied thereto by the pilot, in any one or all four of the axes, (or three axes if desired), while requiring no motion of the stick, other than a minimal amount necessary to detect the force and which is imperceptible to the pilot in contrast to the forces applied by him. The response of the stick to forces, and the capability of the stick to sense the applied forces while itself permitting no motion of any consequence in the direction of any applied force, avoids any conflict between the natural motion and position reflexes of a human hand and forearm, and therefore supplies the capability to provide inputs to all four of the axes without coupling between any of the axes (that is, without an upward motion also tending to be a rearward motion, and the like). A force stick of this type, having imperceptible motion, is readily available in the market, one of which being the Model 404-G517, produced by Measurement Systems, Inc., Norwalk, Conn., U.S.A. Other sticks could readily be utilized; the only requirement for the practice of the present invention being that the stick be sufficiently stiff in all axes and have sufficiently sensitive force measurement characteristics so that a suitable range of force sensitivity (such as on the order of between 0 and 40 lbs. in either direction of each axes) can be achieved while the motion required to sense such forces (such as by strain gages measuring the minute deflection resulting from the applied force) is imperceptible to the pilot while maneuvering in flight. By "imperceptible", it is meant that the motion which results from adequate force inputs to control the aircraft is so slight that there is essentially no sensation of motion, and thus there is no coupling between axes as a consequence of hand motion.

As described hereinbefore, one aspect of the invention is the discovery that a multi-axis stick, capable of use for controlling three or four axes of aircraft response without coupling between axes, is achieved by using a stick which is responsive only to force, with imperceptible motion. However, the application of nearly constant force is inherently fatiguing. Maintaining constant forces in three or four axes at the same time can obviously be an additional source of fatigue.

Futhermore, it has been found that rapid maneuvering in a plurality of axes, such as turning a helicopter 180° during hover in gusty wind conditions, is a difficult task to perform when all four axes of the helicopter are being controlled in a single hand. Although all of the human factor relationships, including functioning of the hand itself and pilot reaction to aircraft response, are not fully understood, it is believed that this difficulty occurs as a consequence of the need for coordinated commands in two or more axes during such complex maneuvers. The force stick of the invention differs from conventional control systems in which the aircraft responds to positions of the controls, which positions can easily be adjusted in a minute fashion, with the aid of the eye and with the aid of relative human member position reaction (e.g. where the hand is with respect to the knee). And it differs from conventional controls which allocate different tasks to different body members that are accustomed to handling those tasks, only the stick or wheel requiring single hand coordination for the pitch and roll axes of control.

The foregoing problems with a multi-axis force stick are overcome by a second aspect of the invention: the provision of a control system which has a close trim follow-up. That is, any input provided by the pilot is used to establish a new trim or reference point of control for the related axis. Thus, with the invention the pilot responds to his observations of aircraft attitude, speed, altitude, and changes therein, provided to him by visual observation or by instruments, and essentially adjusts the current trim position of the aircraft control surfaces to provide corrections thereto.

Figure 2:
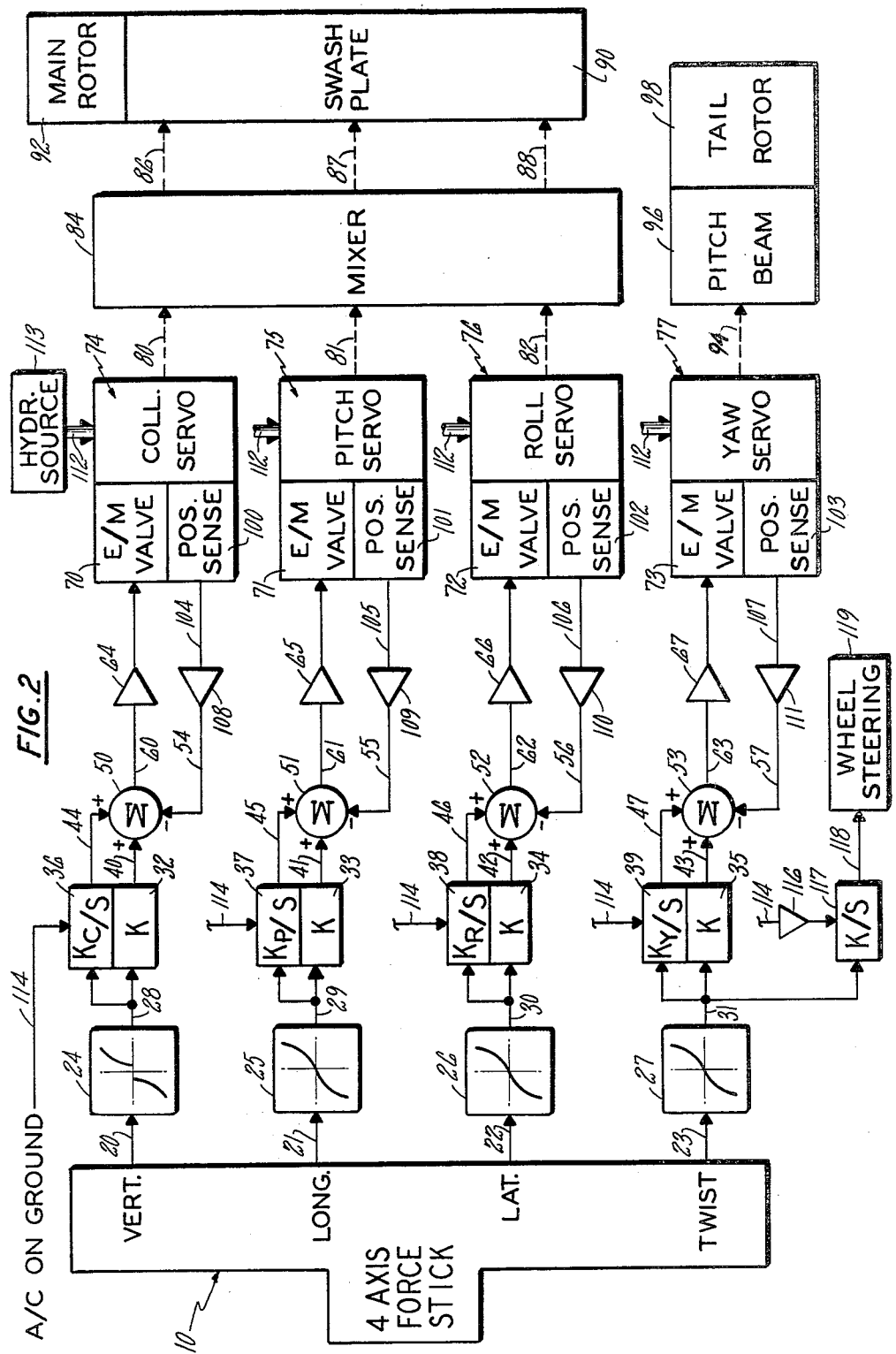
FIG. 2 is a simplified schematic diagram of an aircraft control system, for a helicopter, in accordance with the present invention.

Referring now to FIG. 2, a control system incorporating the present invention employs a four-axis force stick of the type described with respect to FIG. 1. The force stick 10 has a plurality of outputs 20-23 that provide signals of which the voltage is a known function of force applied in the vertical, longitudinal, lateral or twist axis of the stick 10. In the stick 10 described with respect to FIG. 1, each axis is bilateral, providing voltages in respectively opposite polarities for vertical motion in the up and down directions, for longitudinal motion in the force and aft directions, for lateral motion in the right and left directions, and for twist motion in the clockwise and anticlockwise directions. Also, for the force stick described hereinbefore, the voltages are nearly linear functions of force. However, this need not necessarily be so, since a plurality of signal conditioning circuits 24-27, one for each of the outputs 20-23, may be employed to provide a specific voltage to force relationship on signal lines 28-31, which comprises the actual signal input to the control system.

Figure 3:
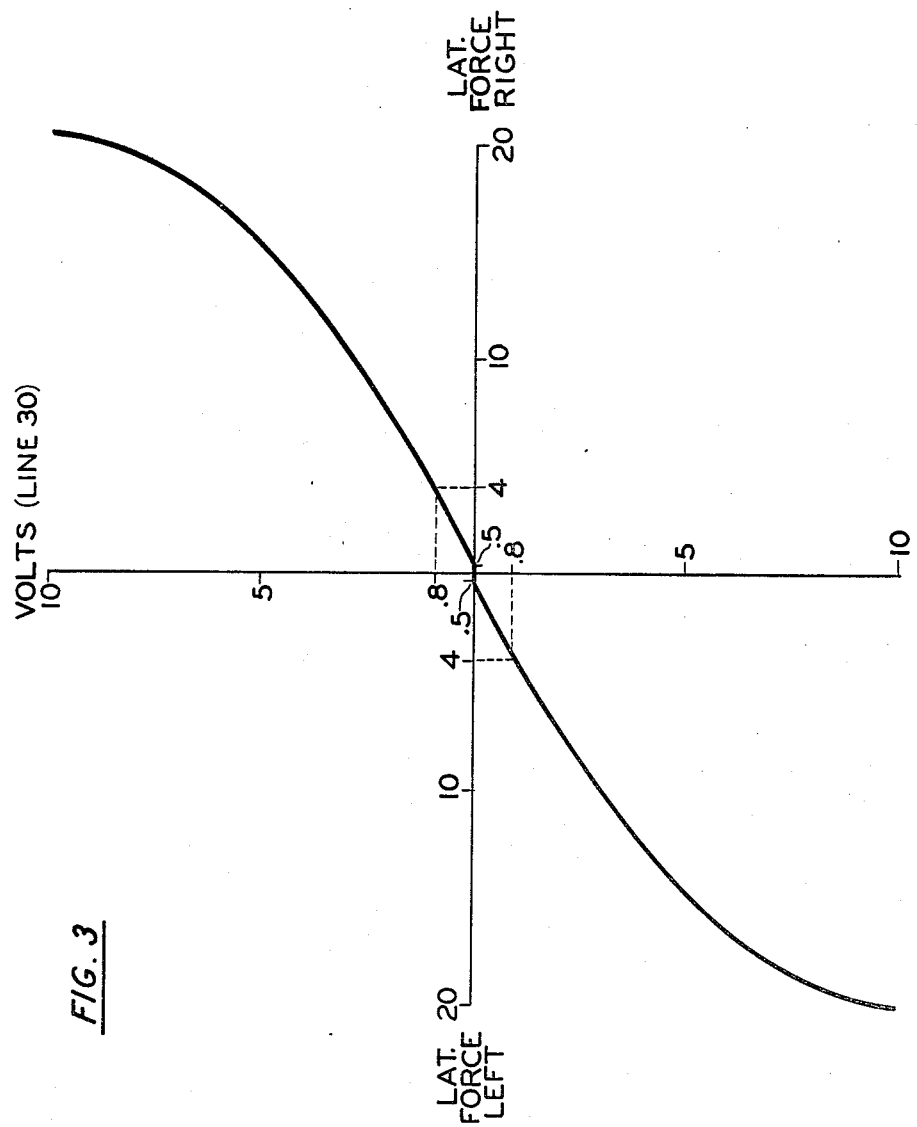
FIG. 3 is an illustration of response characteristics which may be employed in the control system of FIG. 2.

An example of signal conditioning provided by the circuit 26 is illustrated in FIG. 3. Therein, the abscissa is the lateral force, either to the left or to the right, and the ordinate is the voltage at the output of the circuit 26 on the line 30. The signal conditioning is of course a voltage to voltage conditioning, depending upon the force to voltage relationship of the signal on the line 22. However, in terms of desired functional result in the example herein, FIG. 3 illustrates that a dead band of about one-half pound (0.23 Kgm) in either the right or the left direction may be provided, so as to reduce inadvertent pilot inputs and any potential for drift about the lateral-zero center of stick force. This is essential to avoid long-term integration of minute inadvertent signals, as described hereinafter. Then, a rather sensitive region in either direction may be provided for forces between a half pound and four pounds. This may increase linearly from zero volts to 8/10 of a volt (in the correct polarity). Above forces of about 4 lbs. in either direction, the output of the circuit 26 (FIG. 2) as illustrated in FIG. 3 may increase in an increasing fashion with force, so as to provide very sensitive operation at low forces yet provide for fast, full authority response in the control system when needed. In FIG. 3, the voltage to force relationship is shown as being nonlinear, with increasing slope. However, the particular shape may be tailored to suit any implementation of the present invention, depending upon the other factors of the control system, such as the characteristics of the hydraulic servos, as well as the aircraft flight characteristics and desired aircraft response, all as is within the skill of the art.

Figure 4:
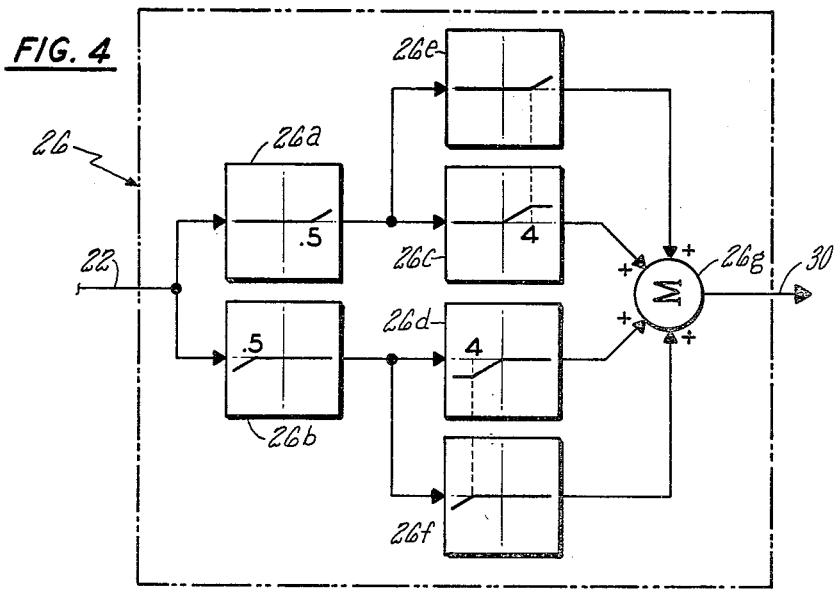
FIG. 4 is a simplified schematic illustration of one manner of implementing a characteristic of FIG. 3 in the system of FIG. 2.

An example of how the signal conditioning of the type illustrated in FIG. 3 may be readily achieved, is illustrated in FIG. 4, which depicts how suitably biased and limited amplifiers might be arranged to provide a composite conditioning of the signal as illustrated in FIG. 3. In FIG. 4, the signal conditioning circuit 26 may comprise six amplifiers 26a-26f. The dead-band amplifiers 26a and 26b each have zero gain until a voltage representative of a half pound of force is reached, after which these amplifiers provide linear gains of one. This simply provides a dead band of ±0.5 lbs. The vernier gain amplifiers 26c and 26d provide the low force sensitivity region, by providing the zero gain for forces of the opposite direction, and for any voltage passed by the dead-band amplifiers 26a, 26b a linear gain of 2/10 of a volt per lb. to a maximum of 8/10 of a volt, where the output is then clamped or limited. The high gain amplifiers 26e and 26f provide the high gain for high forces, which is depicted as nonlinear with increasing slope in FIG. 3. These therefore have zero gain until the output of the vernier gain amplifiers 26e, 26f attains 4 volts, after which the gain increases to the limit of the input signal. The output of the vernier and high gain amplifiers 26c-26f are summed in a summing junction 26g, which may comprise a special summing amplifier or may comprise the input network to proportional and/or integral gain device described with respect to FIG. 2 hereinafter.

The pitch and yaw channels may have signal conditioning to provide characteristics similar to those described with respect to FIG. 3. In fact, the invention has been implemented with a pitch channel characteristic identical to that of the roll channel characteristic illustrated in FIG. 3, and has been implemented with a yaw channel signal conditioning characteristic which differs from the roll characteristic of FIG. 3 only in that the gain is 0.225 volts per inch lb. of torque, and the dead band is ±0.27 inch lbs.

The collective channel, on the other hand, may have a different shape curve, one characterized with negative change in slope with respect to force. As illustrated in FIG. 5, the vertical channel may require 40 lbs. of force for maximum stick inputs (rather than 20 lbs. as in the right-left and fore-aft axes). A dead band of ±1 lb. may be employed, and linear gain in the up direction may be on the order of 0.19 volts per lb. while the gain in the down direction may be on the order of 0.8 volts per lb. but existing over an expanse of 8 lbs. in the negative direction. Additionally, FIG. 5 illustrates that, to accommodate the droop in the relationship between collective pitch and airspeed, the slopes in FIG. 5 may best be decreasing (rather than increasing as in the case of the pitch, roll and yaw channels). Examination of FIG. 4, in any event, illustrates the ease with which the positive or negative dead band may be independently adjusted, and several gains and limits may be combined for either direction in any of the axes, to provide a desired voltage characteristic with respect to the force applied to the stick in either direction of any axis. Similarly, by means of table look up, or by means of calculations utilizing constants which are looked up in a table, based upon the magnitudes of voltage on the lines 20–23, the characteristics of the type illustrated in FIGS. 3 and 5 can be provided digitally in a suitable digital computer, such as that disclosed and claimed in a commonly owned, copending U.S. patent application Ser. No. 938,583, filed on Aug. 31, 1978 by Murphy and Clelford, and entitled FAIL-OPERATIONAL, FAIL-SAFE MULTI-COMPUTER CONTROL SYSTEM, now U.S. Pat. No. 4,270,168.

Referring to FIG. 2, the conditioned signals on the lines 28–31 are fed to a plurality of amplifiers 32–39, the amplifiers 32–35 being proportional amplifiers, and the amplifiers 36–39 being integrating amplifiers. The amplifiers 32–39 therefore provide proportional plus integral gain of the pilot input to the control surfaces of the aircraft. Each of the amplifiers provides an output on a corresponding line 40–47 which are summed in related summing junctions 50–53 along with corresponding negative feedback signals on related lines 54–57. The output of each summing junction is a positional error signal on a related line 60–63 that drives a suitable amplifier 64–67 which in turn controls the electromagnetic valve 70–73 of a hydraulic servo 74–77. Three of the servos 74–76 drive mechanical inputs to a mixer 84 which in turn controls the mechanical inputs 86–88 to a swash plate 90 that in turn controls the pitch of the blades of a main rotor 92. The yaw servo 77 drives the mechanical connection 94 to a pitch beam 96 that controls the pitch of the blades of the tail rotor 98.

Each of the servos 74–77 is provided with a corresponding position sensor 100–103 that provides an electric signal on a related line 104–107 indicative of the position of the mechanical output 80–82, 94 of the corresponding servo. These signals are applied through related amplifiers 108–111, for proper scaling and isolation, to the feedback lines 54–57. At any given moment of time, each of the servos is at a particular position, and if a position is being commanded that differs therefrom, this will manifest itself as a signal on one of the lines 60–63 which, through the amplifiers 64–67, will provide magnetic force in the electromechanical valve 70–73 to divert the valve and create an imbalance in the servo so that hydraulic fluid under pressure applied by a conduit 112 from a source 113 will move the hydraulic piston and therefore the mechanical outputs 80–82 and 94 for the desired action. All of the servo and helicopter apparatus 64–113 is conventional in nature. However, the servos 74–77 must comprise high speed, full authority electrically controlled servos, rather than the electrically trimmed, mechanical booster servos of the type heretofore used in the art to control the aircraft surfaces. Servos suitable for use in incorporating the present invention are readily available.

Considering operation of one of the axes of the control system illustrated in FIG. 2, the new mode of flight control becomes apparent. For instance, should the pilot desire greater collective pitch, he will press upwardly on the stick so as to provide an electrical signal on the vertical axis output 20 as a function of the amount of force that he exerts vertically on the stick. This signal will be level-converted in accordance with the signal conditioning circuitry 24 (i.e. that shown by way of example in FIG. 5) to provide a pilot command signal on the line 28. Instantaneously, the proportional amplifier 32 will amplify the signal on the line 28 and apply it on the line 40 as an input to the summing junction 50. This will automatically cause an imbalance in the output of the summing junction 50 since the servo 74 cannot move the mechanical linkage 80 instantaneously, and therefore the position sensor 100 will be providing a signal over the line 54 to the summing junction indicative of the instantaneous original position of the mechanical linkage 80. Thus, the summing junction 50 will provide a signal on the line 60 which then is amplified by the amplifier 64 and causes an imbalance in the electromagnetic valve 70 to cause the servo 74 to drive the linkage 80 in the desired direction. The servos 74–77 are selected to be capable of moving the control surfaces through 100% of their authority in a very short time, on the order of one second. Depending upon the gains of the signal conditioning circuitry 24 and the amplifiers 32, 64, some pressure exerted by the pilot can result in a signal of sufficient magnitude at the electromagnetic valve 70 so that the servo 74 will apply maximum hydraulic pressure to its piston and thereby maximum accelerating force to the mechanical linkage 80. On the other hand, if the pilot utilizes a small signal, the initial proportional component of that signal which is passed through the proportional amplifier 32 through the summing junction 50 and the amplifier 64, may be only slight and therefore only cause a nudging of the piston within the servo 74.

A system only employing proportional gain, as has just been described, would work perfectly fine except for the fact that the pilot would have to continuously maintain a force that would equal the desired position of the mechanism for balancing with the feedback signal on the line 54 (for example), even during long-term flight with no changes in the control surfaces. This could obviously result in fatigue over many tens of minutes. And, the fatigue is worse in that the forces must be applied in several axes (four, of the invention is employed in a four-axes mode), all at the same time.

Under initial consideration, the foregoing fatigue problem would appear to be readily resolved by a trimmed system of the type used in conventional aircraft controls. In such systems, the controls are positioned until the aircraft flight parameters are as desired, and then the various controls are trimmed to their current positions. This sort of trim position holds the control stick, wheel or pedal in a physical relationship with respect to the aircraft that represents the desired corresponding position of the control surfaces to which they are attached. When the pilot desires to alter the position of the control surfaces with respect to any of the controls, he reengages the particular control at the position where it has been held in trim. He can then move the control against the spring detent or the like to a different position and reengage the trim, or as is the usual case, he can release the trim with respect to the particular control which he desires to adjust, move it to a new position and then reengage the trim. However it is laterally impossible to trim one axis at a time in a three or four axes, single handed force stick. This is due to several factors: first, in a force actuated, proportional system, if the trim engage is effected by means of buttons on the single-handed controller itself, the mere movement of a thumb or a finger to engage the button will alter the forces in one or more of the axes, so that trim is effected at an undesirable point; second, it is almost impossible to reestablish in the force stick the force command to which trim may have been engaged, when it is desired to release the trim and utilize the force stick to establish a new trim point—even if force meters were provided, release of trim in three or four axes at one time would require balancing the actual force in the stick to the trim force by visual comparison, which would be nearly impossible; and, third, actual trimming of the force stick itself would require a highly exotic micro-sensitive position or force holding servo mechanism in each of the four axes, thus mitigating all the advantages which a side-arm controller can provide by introducing new complexities to the system. Finally, timed base trim by ramping electronic signals, to maintain the same actuator position as the force stick, is not practical because the pilot must remove his force gradually to match the trim ramp. For all practical purposes, this is an impossible task. Any mismatch between the pilot's removal of force from the controller and the ramp causes unacceptable aircraft transients. Further, the difficulty of adjusting all four axes at one time during high pilot workload maneuvers, such as ground-related maneuvering of a helicopter (e.g., loading ships), take off or landing of any aircraft in high cross winds, and the like, is aggravated when forces in three or four axes all must be simultaneously adjusted by a single hand.

Another aspect of the invention is providing follow-up to the commands given by the multi-axis force stick. In one example of the invention, the follow-up is provided by feed forward integral gains provided by the amplifiers 36–39 in parallel with the proportional amplifiers 32–35. Thus, in the example of operation given hereinbefore, once the pilot provides a force input which indicates a desired change in the positioning of the linkage 80, the instantaneous effect is created by a signal to the proportional amplifier 32, as described hereinbefore. But before the servo 74 can reach a position to cause the feedback on the line 54 to equal the proportional command on the line 40, the integrating amplifier 36 will commence to have an increasing output on the line 44 of the same polarity as the signal on the line 40. The integrating amplifiers 36–39 are provided with time constants so as to be able to assume the entire pilot input in a time frame which is commensurate with the pilot's reaction to aircraft response, which is on the order of a second or so. Thus, in a typical case, if the pilot desires to trim the control surface by some amount, a very slight input thereto, which is immediately backed-off, may achieve the desired result since the servo 74 will initially respond to the proportional signal on the line 40 and the steady state condition will be quickly reached by a signal on the line 44 balancing the feedback signal on the line 54. In the case of a desire for a large but slow change in the position of a control surface, the pilot may provide a very small force so that the signal from the stick on the line 20 is very small, and the signal to be integrated by the integrating amplifier 36 may be commensurately small. However, if the pilot continues to apply a small force over a period of time, the continuing presence of the signal on the line 20 will cause the integrator 36 to continually build up its output (up to a limited maximum, as described hereinafter) so that the signal on the line 44 can easily exceed, by several orders of magnitude, the signal on the line 40. This would cause the servo 74 to continue to slew the position of the linkage 80 until the feedback signal on the line 44 matches that provided by the proportional gain on the line 40 and the integral gain on the line 44.

In practice, it has been found that the combination of a force transducer (with imperceptible motion) and the proportional plus integral control over the servo in response to the applied force permits the pilot to apply a force until he senses a desired response and to then reduce the force back to zero as the integral gain portion of the system balances up with the feedback signal. Thus, each of the four axes depicted in FIG. 2 have a floating trim point wherein each servo mechanism 74–77 has caused the positioning of the corresponding mechanical linkage 80–82 and 94 to a position where the related feedback signal on a line 54–57 balances with the integral gain signal on the line 44–47. Control over the aircraft is, at all times, in a mode in which the pilot adjusts this floating trim position in any axis by providing a commensurate force in the desired direction for a sufficient period of time and with a sufficient magnitude to achieve the desired change in the floating trim point for that axis, at the desired speed of change. The overall effect from the pilot's viewpoint is that there is a unique trim point, namely, zero force on the controller (actually, force levels within the dead-band region). Further, the specific full scale or saturation level of the force controller tends to be de-emphasized, since the integral control produces a control surface velocity (typically, aircraft acceleration command) for any constant force application. Hence, the pilot does not have to apply full controller force to attain maximum aircraft maneuvering. This replaces the maximum maneuver for full control application found in conventional displacement controllers. Thus, with the invention, the pilot can fly with a loose feel on the stick, or hands off in steady-state flight. Because of the possibility of producing large commands by integrating very small signals provided by the force stick, it is essential that the signal conditioning means provide a dead band for each polarity of each axis of the stick.

In FIG. 2, the line 31 in the yaw channel is connected to an additional integrating amplifier 117 which provides an integral of the twist force on a line 118 to wheel steering mechanism 119. This is not essential to the invention, but is illustrative of the fact that, if steering pedals are eliminated in an aircraft (such as to provide earth visibility around the pilot's feet and to reduce control system weight), the stick could be used for ground steering as well as in-flight maneuvering.

At the top of FIG. 2, a line 114 provides a signal indicative of the fact that the aircraft has touched down, that is, that a wheel or skid is in contact with the ground. Such a signal may be provided by a "squat switch", or derived in some other fashion from the wheel or skid support mechanism on the aircraft. Such a signal is commonly provided in many aircraft for a variety of purposes, such as preventing the operation of automatic flight control stability equipment while the aircraft is on the ground. The signal on the line 114 is applied to each of the integrating amplifiers 36–39 and is connected to operate as an integrator hold signal: depending upon the implementation of the invention, this signal may simply deactivate an electronic switch connected in the integrator feedback path so as to isolate the integrating capacitor from the input to the amplifier. Thus when the aircraft touches the ground, the floating trim point is held constant at the moment, and the pilot then completes maneuvering solely through the proportional path. When the aircraft is shut down, the floating trim points are all electrically reduced to zero, either by specific initialization resets, or otherwise, as is within the skill of the art. Then, when operation of the aircraft is resumed, the signal on the line 114 holds all of the integrators at their initialization value, which is zero. Therefore, any stray controller inputs provided during taxiing or while parked will not cause any command integrations to occur. Thus, it is assured that the trim point of all of the control surfaces is at the neutral position during takeoff, so that no unwanted control inputs can exist at the start of takeoff. Takeoff is therefore effected by the pilot through the proportional loop alone. The signal on the line 114 is also provided to an inverter 116 that causes complementary operation to the integrating amplifier 117 used for steering the aircraft while on the ground (if such apparatus is required).

Referring now to FIG. 6, an indication of power, or authority remaining may be required in systems employing the present invention. In conventional systems, the mechanical linkage actually moved by the pilot as he maneuvers a stick, lever, wheel or pedal includes position responsive means to activate warnings of the fact that the limit of authority in a given axis has been reached. As a substitute for such position-responsive means, electronic means may be provided as illustrated in FIG. 6. For instance, the summation of the proportional and integral outputs may be provided by a summing circuit 50a which does not have the position feedback of the line 54 added to it, thereby providing a position command signal on a line 60a. This can be compared in a summing junction 120 with a suitable reference voltage indicative of 100% authority for the given channel, such as from a source 122, to provide a signal on a line 124 indicative of the remaining authority. This signal may operate a meter 126 to provide a constant, quantitative indication of remaining authority to the pilot, and may also be applied to a level detector 128, the output of which on a line 130 will be indicative of the fact that 90% (or some other fraction) of total authority is currently being commanded in that axis. This may be combined, as in an OR circuit 132, with discrete indications of reaching the threshold limit of authority in other axes, such as provided on lines 134, to generate a caution signal on a line 136 that can operate a caution light 138 as well as a stick shaker 140 or other conventional alarm. The stick shaker in combination with the warning lights and power (or authority) remaining indicator replaces the control stop feel and control meters used to warn pilots of reaching the full limit of authority (the control stops). In fact, having the force stick shake as the particular axis approaches a limit is more desirable as a warning cue than waiting to reach the stop as in positional systems.

The invention, employing the particular force stick described hereinbefore with respect to FIG. 1, has been successfully used in controlling a light helicopter. In that embodiment, the signal conditioning circuits 24–27 had characteristics as described hereinbefore with respect to FIGS. 3–5. The gains of the amplifiers 32–39 were adjusted so as to provide response times which are in the one-half to two second range. For instance, the constant $K_c$ for the integrating amplifier 36 was selected as 1.25, and, with a maximum force input applied vertically on the force axis stick 10, so that a maximum voltage appeared on the line 20, the minimum time for full travel of the servo 74 in either direction was about 1.5 seconds. The constant Kp in the amplifier 37 was selected as 0.5, and provided a minimum time for full travel of the servo 75 in either direction of about 2 seconds. The constant $K_R$ in the amplifier 38 was selected as 1.0, and provided a minimum time, for full travel of the servo 76 in either direction, of about 1 second. And, the constant $K_Y$ in the amplifier 39 was selected as 1.25 and provided a minimum time, for full travel in either direction of the servo 77, of about 0.8 seconds. The gains are relative to the gain of the corresponding proportional channel; however each of these gains are adjusted in dependence upon the gain relationship provided by the signal conditioning circuits 24–27 and the characteristics (such as the servo mechanism gain) provided in the remainder of the system, all as is well known in the art.

The description thus far has been essentially in terms of analog controls, employing amplifiers having suitable gains, limits and integrating characteristics, and the summing of analog voltages to drive the servo valves. However, the invention may as well be practiced, and in many cases will be preferably practiced, in a system in which the signal conditioning, the integrating, the summing and the like are all provided by one or more digital computers. One example is the dual computer system disclosed in the aforementioned copending U.S. patent application. To practice the invention in an aircraft utilizing such computers, the voltage outputs of the force stick 10 would be accessed through various multiplexed inputs to the analog to digital converter in FIG. 1 of said application and the electromagnetic valves 70–73 would be driven as is illustrated in FIGS. 1 and 2 of said application. Obviously, if a twin computer system were used, both computers would be connected in each of the axes. On the other hand, it is of course possible to use only a single computer, if desired.

The signal processing, as alluded to briefly hereinbefore, could either be solely by table look up, or a combination of table look up for constants followed by calculations employing the constants. All of the digital techniques required for implementing the functions described hereinbefore with respect to FIG. 2 are well known in the art, being currently utilized in various systems for similar aircraft control but not control in the new mode provided by the present invention.

The invention is readily used with automatic flight control systems, such as autopilots which control altitude, speed and heading, and such as stability augmentation systems that compensate for external inputs to aircraft attitude, such as by wind gusts and the like. The coupling of automatic flight control systems to an aircraft control system employing the invention is rendered quite simple, since the flying to a trim point is already achieved with the invention, the trim point being correctable by the automatic pilot as a function of gyro outputs, and being stabilized by the stability augmentation systems as a function of rate gyro outputs. For instance, the autopilot functions could be summed to the input of the appropriate integrating amplifiers 36-39, and the stability inputs could be summed into the proportional amplifiers 32-35 or into the summing junctions 50-53. This would cause the autopilot trim point to coincide with the actual trim point memorized in the integral path of the system. On the other hand, both autopilot functions could be simply summed in the summing junctions 50-53, if desired; in such case, the deviations corrected for by the autopilot would be electrical input signals indicative of the offset from the trim point established in each axis by the integral path thereof. In either case, the electrical signals from the automatic flight control equipment must be suitably conditioned to take into account the differences between a positional, mechanical system of the conventional type and the system described herein. For instance, the magnitude of stability signals should be kept low, on the order of 5% or 10% of authority; and the autopilot signals should have a limited rate of change, although operating with full authority. If the automatic stability signals are summed in after the integral path, and added to the floating trim point of the invention, the trim point for stability signals should be continuously updated by the autopilot signals, so as to permit the mean point of limited stability authority to follow the variations in the autopilot trim point. And, all the techniques known and used for such automatic flight control systems are directly applicable to the present invention, requiring no other special considerations when being employed in an aircraft control system according to the invention.

The invention has been described principally in terms of a rotary wing aircraft (helicopter). However, the principles of the invention are equally applicable to control systems utilized for fixed wing aircraft. In the case of fixed wing aircraft, the longitudinal axis would control the elevator, the lateral axis would control the ailerons, and the twist axis would control the rudder. The vertical axis could be used to control speed and/or lift (e.g., engine thrust or propeller pitch), to suit any particular implementation of the invention, as desired. Naturally, the time constants and signal conditioning derived for such system would be based on the skill of the art in providing servo control to the aerodynamic surfaces of a fixed wing aircraft. However, there is nothing special that need be taken into account when providing a fixed wing aircraft control system in accordance with the invention, other than is described hereinbefore.

If desired, the function of the mechanical mixer 84 could be performed by electric signal combinations, in a fly-by-wire system incorporating the invention. Then, the signals would directly drive the main servos in the swash plate 90 (not shown), which would be electromagnetic (or the like) rather than mechanical. And, the four axes of the force stick would not then have a one-to-one correspondence with any particular servo. The significant fact is that the invention provides integral and proportional control over an aerodynamic axis of the aircraft in response to force inputs to a corresponding axis of a stick having at least three axes.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A control system for providing principal manual control to an aircraft having four control axes, said four control axes including pitch, roll, yaw and lift/speed, said control system including:
    a plurality of positionable aerodynamic surfaces, the positions of which control the aircraft in said four control axes;
    control means operable by a pilot to provide desired position command signals indicative of desired aerodynamic surface positions; and
    positioning means connected between said control means and said aerodynamic surfaces and operative in response to said desired position command signals applied thereto to control the positioning of said aerodynamic surfaces;
    characterized by said control means comprising:
    a multi-axis force stick adapted to be held by the hand of the pilot for providing output signals indicative of forces applied to the stick in at least three distinct stick axes, each of said stick axes corresponding to a related one of said aircraft control axes; and
    a plurality of signal processing channels, each connected for response to the output signal related to a corresponding one of said stick axes, each providing a related desired position command signal to said positioning means which is the summation of a proportional function of the related force stick output signal and an integral function of the related force stick output signal, for providing manual control of the aircraft by flying to a floating trim point established by force inputs to said force stick, the integral portion of each desired position control signal establishing the trim point for each axis and the proportional portion of each desired position control signal causing deviation from the trim point in such axis.

2. A control system according to claim 1 characterized by means responsive to the aircraft being in contact with the ground to provide an integration hold signal to said signal processing channels, and said signal processing channels each providing, in response to the presence of said integration hold signal, said positioning command signals as the summation of a proportional function of said force stick output signals and the integral function thereof which exists at the time of provision of said integration hold signal.

3. A control system according to claim 1 characterized by said signal processing channels having integral time constants selected to provide full authority over the corresponding control surface within on the order of 0.5 to 2 seconds following receipt of a maximum signal from the corresponding axis of said force stick.

* * * * *